(12) United States Patent
Hammad et al.

(10) Patent No.: US 11,081,712 B2
(45) Date of Patent: Aug. 3, 2021

(54) METHOD AND SYSTEM TO MODIFY THE PERFORMANCE OF A REDOX FLOW BATTERY

(71) Applicant: Saudi Arabian Oil Company, Dhahran (SA)

(72) Inventors: Ahmad D. Hammad, Dhahran (SA); Stamatios Souentie, Dhahran (SA); Abdulrahman Alsuhaibani, Khobar (SA); Issam T. Amr, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 195 days.

(21) Appl. No.: 16/171,542

(22) Filed: Oct. 26, 2018

(65) Prior Publication Data

US 2020/0136161 A1   Apr. 30, 2020

(51) Int. Cl.
*H01M 8/04858*   (2016.01)
*H01M 8/18*   (2006.01)

(52) U.S. Cl.
CPC ....... *H01M 8/04873* (2013.01); *H01M 8/188* (2013.01); *H01M 2300/0005* (2013.01)

(58) Field of Classification Search
None
See application file for complete search history.

(56) References Cited

U.S. PATENT DOCUMENTS

| 4,786,567 | A | 11/1988 | Skyllas-Kazacos et al. |
| 9,287,580 | B2 | 3/2016 | Jain |
| 2003/0022032 | A1 | 1/2003 | Miller et al. |

FOREIGN PATENT DOCUMENTS

| EP | 2160783 B1 | 8/2013 |
| JP | 5052033 B2 | 10/2012 |

(Continued)

OTHER PUBLICATIONS

International Search Report and Written Opinion pertaining to Application No. PCT/US2019/056471 dated Jan. 24, 2020, 13 pgs.

(Continued)

*Primary Examiner* — Carmen V Lyles-Irving
(74) *Attorney, Agent, or Firm* — Dinsmore & Shohl LLP

(57) ABSTRACT

According to one embodiment of the present disclosure, a redox flow battery is provided comprising an ionically conductive separator, a working side flowing electrolyte, a working electrode in ionic contact with the working side of the ionically conductive separator and the working side flowing electrolyte, a counter electrode, and an auxiliary electrode peripherally circumscribed by the working electrode in a common layer of the flow battery. The auxiliary electrode is in ionic contact with the working electrode, an electrically insulating peripheral gap separates the auxiliary electrode from the working electrode. A working electrode terminal is conductively coupled to the working electrode, an auxiliary electrode terminal is conductively coupled to the auxiliary electrode, and a counter electrode terminal is conductively coupled to the counter electrode. An auxiliary power source is configured to establish an auxiliary circuit voltage differential between the counter electrode terminal and the auxiliary electrode terminal, control an auxiliary electrode voltage such that the auxiliary electrode voltage is within an electrochemical window of the working side flowing electrolyte, and establish a voltage differential between the working electrode terminal and the auxiliary electrode terminal. A method of operation of the redox flow battery is further provided.

19 Claims, 6 Drawing Sheets

(56) References Cited

FOREIGN PATENT DOCUMENTS

| WO | 2005008820 A1 | 1/2005 |
| WO | 2008147352 A1 | 12/2008 |
| WO | 2013188636 A1 | 12/2013 |
| WO | 2014091283 A1 | 6/2014 |
| WO | 2014101863 A1 | 7/2014 |
| WO | 2014104146 A1 | 7/2014 |
| WO | 2014157274 A1 | 10/2014 |

OTHER PUBLICATIONS

Balomenou et al., "Triode Fuel Cells", Solid State Ionics, vol. 177, pp. 2023-2027, Feb. 2006.
Sapountzi et al., "Enhanced performance of CO poisoned proton exchange membrane fuel cells via triode operation", Electrochimica Acta, vol. 56, pp. 6966-6975, Jun. 2011.
Tsampas et al., "Triode operation of CO poisoned PEM fuel cells: Fixed and cyclic potential triode operation", Solid State Ionics, vol. 225, pp. 272-276, Mar. 2012.

METHOD AND SYSTEM TO MODIFY THE PERFORMANCE OF A REDOX FLOW BATTERY

BACKGROUND

The present disclosure relates to redox flow batteries and, more specifically, to three-electrode controlled potential redox flow batteries and methods for operation thereof.

BRIEF SUMMARY

Redox flow batteries tend to suffer from excessive overpotential at one of the electrodes. This excessive overpotential leads to decreased efficiency and decreased effective energy storage capacity. Accordingly, the present inventors have recognized a need for redox flow battery designs which may improve the efficiency of one or more redox flow battery electrodes. In accordance with one embodiment of the present disclosure, three electrode redox flow battery designs which utilize an auxiliary electrode to control the potential of the working electrode may be suitable for decreasing the overpotential requirements of the redox flow battery electrodes. The presently described redox flow battery designs decrease the overpotential requirements of the working and counter electrodes without conducting significant faradaic activity at the auxiliary electrode. Such designs may lead to increases in current of 73:1 at the working electrode, relative to the current required at the auxiliary electrode According to one embodiment of the present disclosure, a redox flow battery is provided comprising an ionically conductive separator, a working side flowing electrolyte, a working electrode in ionic contact with the working side of the ionically conductive separator and the working side flowing electrolyte, a counter electrode, and an auxiliary electrode peripherally circumscribed by the working electrode in a common layer of the flow battery. The auxiliary electrode is in ionic contact with the working electrode, an electrically insulating peripheral gap separates the auxiliary electrode from the working electrode. A working electrode terminal is conductively coupled to the working electrode, an auxiliary electrode terminal is conductively coupled to the auxiliary electrode, and a counter electrode terminal is conductively coupled to the counter electrode. An auxiliary power source is configured to establish an auxiliary circuit voltage differential between the counter electrode terminal and the auxiliary electrode terminal, control an auxiliary electrode voltage such that the auxiliary electrode voltage is within an electrochemical window of the working side flowing electrolyte, and establish a voltage differential between the working electrode terminal and the auxiliary electrode terminal.

According to another embodiment of the present disclosure, the auxiliary power source is configured such that a ratio of a boosted power circuit current minus a conventional power circuit current to auxiliary circuit current is greater than 1:1, when the auxiliary power source is activated. The respective total surface areas of the working electrode and the auxiliary electrode define a working electrode to auxiliary electrode surface area ratio of at least 5:1.

According to yet another embodiment of the present disclosure, a method of operating a redox flow battery includes passing the working side flowing electrolyte across the working electrode and the auxiliary electrode, passing the counter side flowing electrolyte across the counter electrode, and controlling a voltage across the auxiliary circuit. The voltage across the auxiliary circuit is controlled such that a potential at the auxiliary electrode is within the electrochemical window of the working side flowing electrolyte and a ratio of power circuit current increase to auxiliary circuit power, when the auxiliary power source is activated, is at least 5:1.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
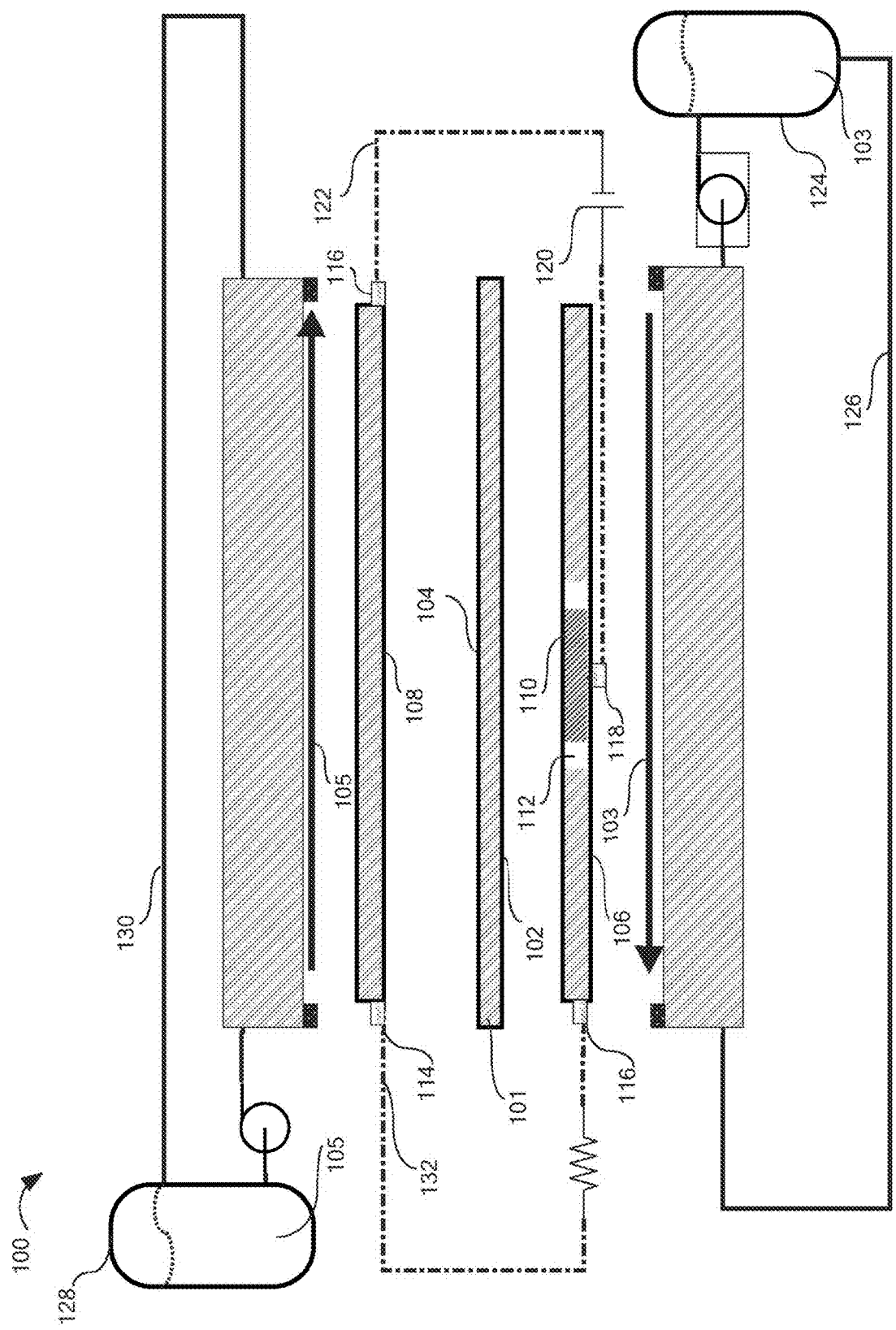
FIG. 1 is an exploded schematic view of the redox flow battery, according to one or more embodiments described herein.

FIG. 1 illustrates a redox flow battery 100 comprising an ionically conductive separator 101 comprising a working side 102 and a counter side 104, a working side flowing electrolyte 103, and a counter side flowing electrolyte 105. The redox flow battery 100 further comprises a working electrode 106, a counter electrode 108, and an auxiliary electrode 110. The working electrode 106 is in ionic contact with the working side 102 of the ionically conductive separator 101 and the working side flowing electrolyte 103. The counter electrode 108 is in ionic contact with the counter side 104 of the ionically conductive separator 101 and the counter side flowing electrolyte. The auxiliary electrode 110 is peripherally circumscribed by the working electrode 106 in a common layer of the redox flow battery 100.

The auxiliary electrode 110 may be in ionic contact with the working electrode 106, the working side flowing electrolyte 103, and the working side 102 of the ionically conductive separator. An electrically insulating peripheral gap 112 may separate the auxiliary electrode 110 from the working electrode 106.

The redox flow battery 100 may further comprise a counter electrode terminal 114 conductively coupled to the counter electrode 108, a working electrode terminal 116 conductively coupled to the working electrode 106, and an auxiliary electrode terminal 118 conductively coupled to the auxiliary electrode 110. The counter electrode terminal 114, working electrode terminal 116, and auxiliary electrode terminal 118 are each structured to transfer electrical energy to their respective electrodes with a minimum of electrical resistance.

An auxiliary power source 120 may be electrically connected to the auxiliary electrode terminal 118 and the counter electrode terminal 114.

The auxiliary power source 120 may be configured to establish an auxiliary circuit 122 voltage differential between the counter electrode terminal 114 and the auxiliary electrode terminal 118. The auxiliary power source 120 may be configured to control an auxiliary electrode 110 voltage such that the auxiliary electrode 110 voltage is within an electrochemical window of the working side flowing electrolyte 103. The auxiliary power source 120 may be configured to establish a voltage differential between the working electrode terminal 116 and the auxiliary electrode terminal 118.

It should be understood that the auxiliary circuit 122 need not be connected to the working electrode terminal 116 to establish the voltage differential. The electrochemical window of a substance is defined as the voltage range between which the substance is neither oxidized nor reduced. For example, the electrochemical window of water on platinum is from 0.00 Volts (V) to −1.23 V vs a standard hydrogen electrode (SHE). It is believed that controlling the potential of the auxiliary electrode 110 within the electrochemical window of the working side flowing electrolyte 103 will prevent the electrolysis of the working side flowing electrolyte 103 and the dissipation of energy which would be associated with such a reaction. Without being limited by theory, it is believed that control of auxiliary circuit 122 voltage rather than current may decrease energy losses associated with the auxiliary circuit 122 while maximizing the voltage at the working electrode 106.

The working side flowing electrolyte 103 may be at least partially contained in a working side flowing electrolyte chamber 124 which is in fluid communication with one or more working side flow channels via a working side electrolyte conduit 126. The counter side flowing electrolyte 105 may be at least partially contained in a counter side flowing electrolyte chamber 128 which is in fluid communication with one or more counter side flow channels via a counter side electrolyte conduit 130. Mixing of the working side flowing electrolyte 103 and the counter side flowing electrolyte 105 should be prevented to the largest degree possible as it represents a source of loss for the redox flow battery 100.

The auxiliary power source 120 may comprise a substantially constant or a variably controllable power source. Any system suitable for maintaining a controlled voltage may be utilized for the auxiliary power source. For example, auxiliary power source 120 options may include a potentiostat, a battery, electrical energy from a power circuit of the redox flow battery 100, electrical energy from the local power grid, or any other source of electrical energy. The auxiliary power source may attain the desired voltage based on a chemical reaction, power electronics such as resistors, or both.

According to some embodiments, the working side flowing electrolyte 103 may comprise an aqueous acidic solution and the auxiliary electrode 110 voltage may be less than 1.23 V vs SHE. 0 to 1.23 V vs SHE is the smallest electrochemical window available for aqueous solutions and as such, staying within this window may prevent oxidation of an aqueous working side flowing electrolyte 103. It is believed that while electrolysis of the working side flowing electrolyte 103 may increase power produced by the power circuit, it may also increase power consumed by the auxiliary circuit 122 and therefore may decrease net power produced by the battery.

Because voltage is a relative number, when a voltage is specified in this disclosure, it is given in relation to a standard hydrogen electrode (SHE) reference. When a voltage is specified for a circuit or across two terminals, the relative voltage is given and no reference is needed.

The auxiliary electrode 110 voltage may be between 0.40 V and 1.22 V vs a SHE. For example, the auxiliary electrode 110 voltage may be between 0.4 V and 0.5 V, 0.5 and 0.6 V, 0.7 V and 0.8 V, 0.8 V and 0.9 V, 0.9 V and 1.0 V, 1.0 V and 1.1 V, or 1.1 V and 1.2 V, or any combination thereof.

The auxiliary power source 120 may be configured such that a ratio of a boosted power circuit current (BPCC) minus a conventional power circuit current (CPCC) to auxiliary circuit current (ACC) is greater than 10:1, when the auxiliary power source is activated. The above relationship can be represented by the equation (BPCC-CPCC):ACC. For example, the ratio of (BPCC-CPCC):ACC may be greater than 1:1, 2:1, 3:1, 4:1, 5:1, 6:1, 7:1, 8:1, 9:1, 10:1, 12:1, 14:1, 16:1, 18:1, 20:1, 25:1, 30:1, 35:1, 40:1, 45:1, 50:1, 60:1, 70:1, 80:1, 90:1, 100:1, 120:1, 140:1, 160:1, 180:1, 200:1, 220:1, 240:1, 260:1, or even greater than 280:1.

The auxiliary power source 120 may be configured such that a ratio of a boosted power circuit current minus a conventional power circuit current to auxiliary circuit current is greater than 10:1, when the auxiliary power source is activated.

The auxiliary power source 120 may be configured such that a ratio of a boosted power circuit current minus a conventional power circuit current to auxiliary circuit current is greater than 1:1, when the auxiliary power source 120 is activated.

The auxiliary power source 120 may be configured such that a ratio of a boosted power circuit power (BPCP) minus a conventional power circuit power (CPCP) to auxiliary circuit power (ACP) is greater than 1:1, when the auxiliary power source is activated. The above relationship can be represented by the equation (BPCP-CPCP):ACP. For example, the ratio of (BPCP-CPCP):ACP may be greater than 1:1, 2:1, 3:1, 4:1, 5:1, 6:1, 7:1, 8:1, 9:1, 10:1, 12:1, 14:1, 16:1, 18:1, 20:1, 25:1, 30:1, 35:1, 40:1, 45:1, 50:1, 60:1, 70:1, 80:1, 90:1, 100:1, 120:1, 140:1, 160:1, 180:1, 200:1, 220:1, 240:1, 260:1, 280:1, 300:1, 350:1, 400:1, 450:1, 500:1, 550:1, 600:1, or even greater than 600:1.

The power circuit 132 refers to the connection between the working electrode and the counter electrode. The boosted power circuit current refers to the current flowing through the power circuit 132 when the auxiliary power source 120 is activated. The conventional power circuit current refers to the current flowing though the power circuit 132 when the auxiliary power source 120 is deactivated or missing.

It is contemplated that, under some conditions, the ratio of (BPCC-CPCC):ACC may be greater than 10:1, although this would be unusual. For example, referring to the data illustrated in FIG. 4, the average auxiliary electrical current over the first hour is 0.19 milliamperes (mA) and referring to the data illustrated in FIG. 5, the average BPCC-CPCC over the first hour is 49.5 mAh. This corresponds to a ratio of (BPCC-CPCC):ACC of approximately 265:1.

The working electrode 106 may comprise a carbon felt or the working electrode 106 may comprise a carbon paper without a microporous surface. Without being limited by theory, it is believed that relative to fuel cell reactions, redox flow battery reactions take place further from the ionically conductive separator so a high surface area electrode is desirable. The lack of a microporous layer on the electrode is considered desirable because it improves mass transport of the working side flowing electrolyte 103 to the working side 102 of the ionically conductive separator.

According to some embodiments, the working electrode 106 may be substantially free of metallic electro-catalysts. In general, one important advantage of redox flow batteries relative to fuel cells is that redox flow batteries may not require metallic electro-catalysts.

The ionically conductive separator, the working electrode 106, the counter electrode 108, and the auxiliary electrode 110 may comprise a substantially planar geometry. Alternatively, the ionically conductive separator, the working electrode 106, the counter electrode 108, and the auxiliary electrode 110 may comprise a substantially cylindrical geometry. Further, the ionically conductive separator, the working electrode 106, the counter electrode 108, and the auxiliary electrode 110 may comprise any geometry suitable for a redox flow battery.

The redox flow battery 100 may comprise a working side end plate and a counter side end plate. The end plates serve to provide strength, rigidity, and compression to the redox flow battery 100. The end plates may serve as a manifold to transfer the flowing electrolytes from the electrolyte conduits into the electrolyte channels. The end plates may comprise copper, gold, steel, stainless steel, titanium, aluminum, or a combination, or layers thereof.

The redox flow battery 100 may comprise one or more fluidic seals. The fluidic seals may be disposed around the peripheral border of the ionically conductive separator 101 and may be configured to prevent the leakage of the working side flowing electrolyte 103 and the counter side flowing electrolyte 105. The fluidic seals may comprise Teflon, elastomeric materials, rubber, metal, or a combination thereof. The fluidic seals may be disposed in channels on the working side end plate, the counter side end plate, or both. The fluidic seals may comprise a substantially planar, cylindrical, or toroidal geometry.

Figure 2:
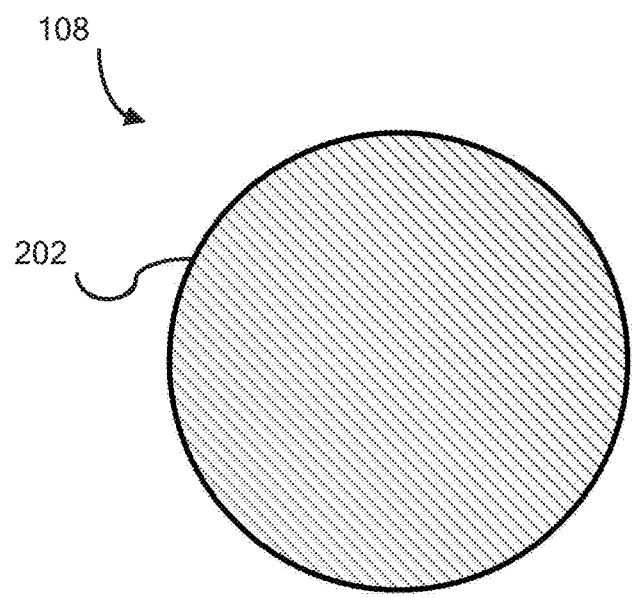
FIG. 2 is a top down perspective view of the counter electrode of the redox flow battery, according to one or more embodiments described herein.
Figure 3:
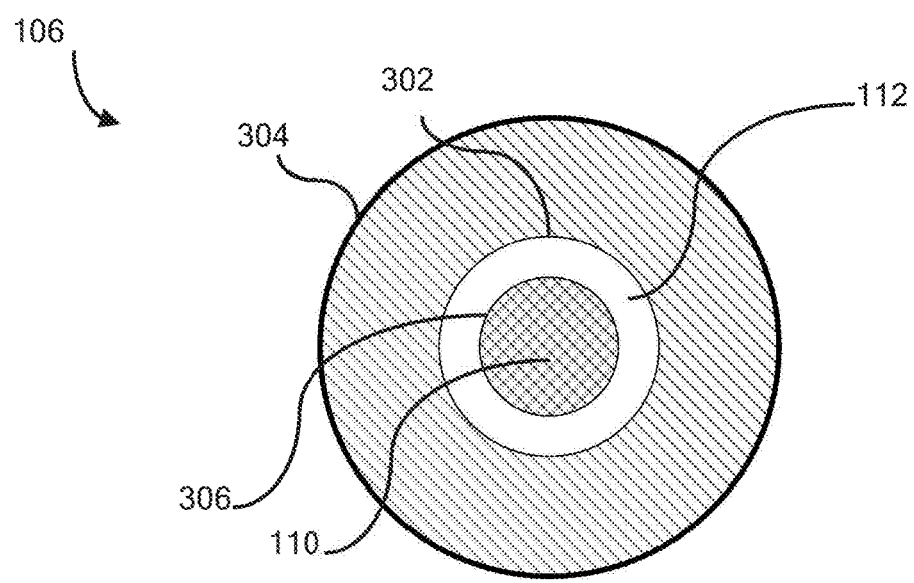
FIG. 3 is a top down perspective view of the working electrode and auxiliary electrode of the redox flow battery, according to one or more embodiments described herein.

Referring now to FIGS. 2-3, the counter electrode 108 may define a circular geometry similar in exterior size and shape to working electrode 106. The counter electrode may comprise an outside diameter 202.

Referring now to FIG. 3, the working electrode 106 may define a circular geometry comprising a working electrode inside diameter 302, a working electrode outside diameter 304, and a working electrode surface area defined between the working electrode inside diameter and the working electrode outside diameter. The auxiliary electrode 110 may define a circular geometry comprising an auxiliary electrode outside diameter 306 circumscribing an auxiliary electrode surface area. The electrically insulating peripheral gap 112 may comprise an annular region between the working electrode inside diameter 302 and the auxiliary electrode outside diameter 306.

The respective total surface areas of the working electrode 106 and the auxiliary electrode 110 may define a working electrode 106 to auxiliary electrode 110 surface area ratio of at least 5:1. For example, the ratio may be between 5:1 and 10:1, 10:1 and 20:1, 20:1 to 30:1, 30:1 to 40:1, 50:1 to 60:1, 60:1 to 70:1, 70:1 to 80:1, 80:1 to 90:1, 90:1 to 100:1, or even greater than 100:1, or any combination thereof. Embodiments are envisioned which encompass multiple subranges such as 20:1 to 100:1. Without being limited by theory, it is believed that maximizing the ratio of working electrode surface area to auxiliary electrode surface area may lead to the greatest improvement in net cell performance by decreasing the opportunity for faradaic reactions to occur at the auxiliary electrode.

The respective total surface areas of the working electrode 106 and the auxiliary electrode 110 may define a working electrode 106 to auxiliary electrode 110 surface area ratio of between 5:1 and 100:1.

The respective total surface areas of the working electrode 106 and the auxiliary electrode 110 may define a working electrode 106 to auxiliary electrode 110 surface area ratio of 8:1.

The electrically insulating peripheral gap may have a thickness between than 5 mm and 0.001 mm. For example, the electrically insulating peripheral gap may have a thickness of between 5 and 4, or 4 and 3, or 3 and 2, or 2 and 1, or 1 and 0.75, or 0.75 and 0.5, or 0.5 and 0.25, or 0.25 and 0.1, or 0.1 and 0.05, or 0.05 and 0.001 mm, or any combination thereof. Without being limited by theory, it is believed that minimizing the thickness of the electrically insulating peripheral gap will lead to the greatest cell performance. This is believed to be caused by increased effect of auxiliary electrode potential on working electrode potential. The electrically insulating peripheral gap may comprise an electrically insulating material. For example, but without limitation air, vacuum, a membrane material such as a proton exchange membrane, a rubber, Teflon, or other insulating material.

The working side flowing electrolyte 103 may comprise an aqueous acidic solution. The working side flowing electrolyte 103 may have a conductivity of at least 0.045 Siemens per centimeter (S/cm). For example the working side flowing electrolyte 103 may have a conductivity of at least 0.0005 S/cm, 0.0001 S/cm, 0.0002 S/cm, 0.004 S/cm, 0.008 S/cm, 0.01 S/cm, 0.02 S/cm, 0.04 S/cm, 0.08 S/cm, 0.1 S/cm, 0.2 S/cm, 0.4 S/cm, 0.6 S/cm, 0.8 S/cm, 1 S/cm, 2 S/cm, 4 S/cm, 6 S/cm, 8 S/cm, 10 S/cm, 20 S/cm, 40 S/cm, 60 S/cm, or even greater than 60 S/cm, or any combination thereof.

The working side flowing electrolyte 103 may comprise one or more of vanadium, iron, chromium, bromine, chlorine, sulfuric acid, hydrochloric acid, redox active organic chemicals, zinc, lithium, and aluminum. According to some embodiments, the working side flowing electrolyte 103 may comprise vanadium chloride and hydrochloric acid.

The counter side flowing electrolyte 105 may comprise one or more of vanadium, iron, chromium, bromine, chlorine, sulfuric acid, hydrochloric acid, redox active organic chemicals, zinc, lithium, and aluminum. The counter side flowing electrolyte 105 may comprise iron chloride and hydrochloric acid.

The working side flowing electrolyte 103 and the counter side flowing electrolyte 105 may be contained in separate flow paths. Referring again to FIG. 1, the working side flowing electrolyte 103 may be contained in the working side flow channels, the working side electrolyte conduit 126, and the working side flowing electrolyte chamber 124. The counter side flowing electrolyte 105 may be contained in the counter side flowing electrolyte chamber 128, the counter side flow channels and the counter side electrolyte conduit 130.

The redox flow battery 100 may be structurally configured such that the working side flowing electrolyte 103 and the counter side flowing electrolyte 105 are only in ionic communication through the ionically conductive separator 101.

The ionically conductive separator 101 may comprise a proton exchange membrane. By way of example, and not by way of limitation, it is contemplated that the proton exchange membrane may be a sulfonic acid membrane such as a Nafion® membrane.

The ionically conductive separator 101 may comprise an anion exchange membrane. By way of example, and not by way of limitation, it is contemplated that the anion exchange membrane may be Fumasep or a quaternary ammonium based membrane.

The ionically conductive separator 101 may comprise a size exclusion membrane. For example, the ionically conductive separator 101 may be a zeolite, a nanoscale thickness gold membrane, an asbestos membrane, an ultrafiltration membrane, a nanofiltration membrane, a reverse osmosis membrane, a polymer membrane, or a hydrocarbon membrane.

The method may comprise passing the working side flowing electrolyte 103 across the working electrode 106 and the auxiliary electrode 110, passing the counter side flowing electrolyte 105 across the counter electrode 108, and controlling a voltage across the auxiliary electrical circuit such that the potential at the auxiliary electrode 110 is within the electrochemical window of the working side flowing electrolyte 103; and a ratio of power circuit 132 current increase to auxiliary circuit 122 power, when the auxiliary power source 120 is activated, is at least 5:1.

Examples

In one exemplary embodiment a battery was constructed as depicted in FIGS. 1-3, with a 3.9 $cm^2$ carbon felt working electrode 106, 0.25 $cm^2$ carbon felt auxiliary electrode 110, and a 4.4 $cm^2$ carbon felt counter electrode 108. The working side flowing electrolyte 103 was a solution of 1.5 M $FeCl_2$ and 3M HCl. The counter side flowing electrolyte 105 was a solution of 1.5 M $VCl_3$ and 3 M HCl. A NAFION 117 proton exchange membrane was used as the ionically conductive separator 101. The battery was configured with a 10 Ohm resistor connecting the working electrode terminal 116 to the counter electrode terminal 114, and allowed to freely discharge.

Figure 4:
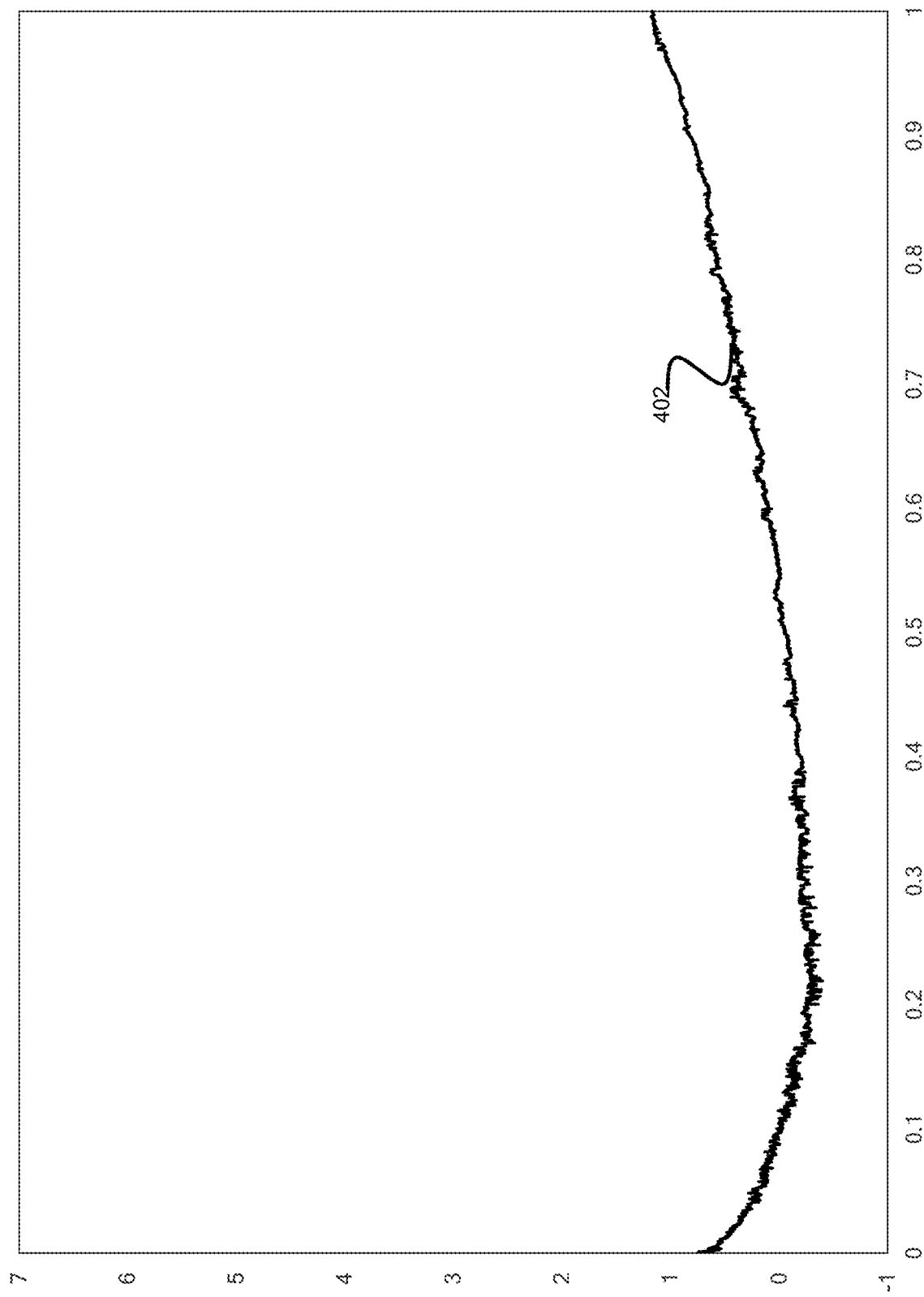
FIG. 4 is a graphical depiction of the auxiliary circuit current vs time, according to one embodiment of the present disclosure.

The cell was configured with a 0.9 V potential across the auxiliary circuit 122. FIG. 4 shows the auxiliary circuit current (ACC) 402. The x-axis is given in units of hours and the y-axis is given in units of milliamps. As can be seen in FIG. 4, the current averages around 0 mA and does not exceed 2 mA in the first hour of operation.

Figure 5:
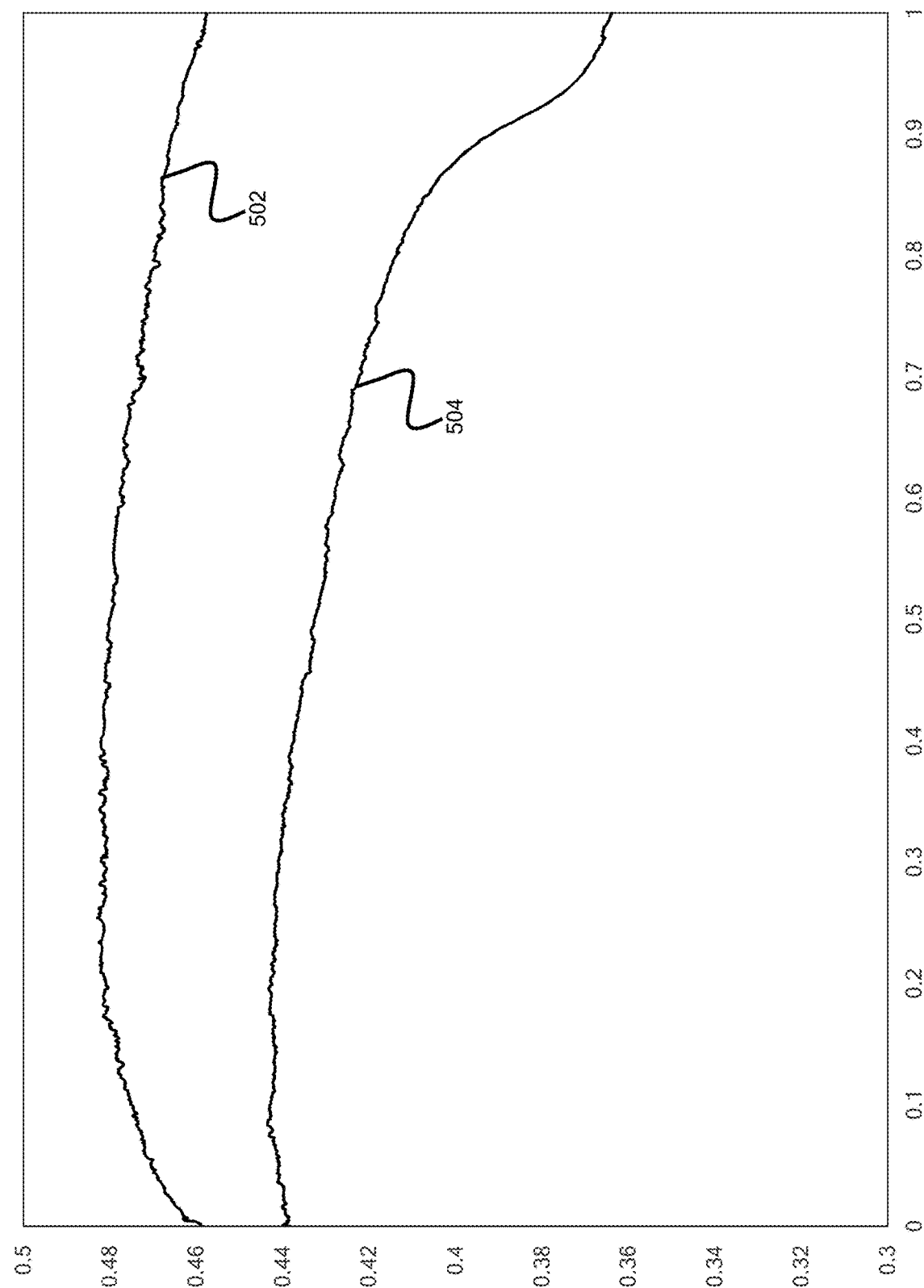
FIG. 5 is a graphical depiction of the discharge current vs time showing the effect of the application of the auxiliary circuit potential according to embodiments of the present disclosure.

FIG. 5 shows a boosted power circuit current 502 and a conventional power circuit current 504. The x-axis is given in units of hours and the y-axis is given in units of amps. At a discharge time of 1 hr, the boosted power circuit current 502 is increased by 23% relative to the conventional power circuit current 504. This is a BPCC-CPCC:ACC ratio of 71:1.

Figure 6:
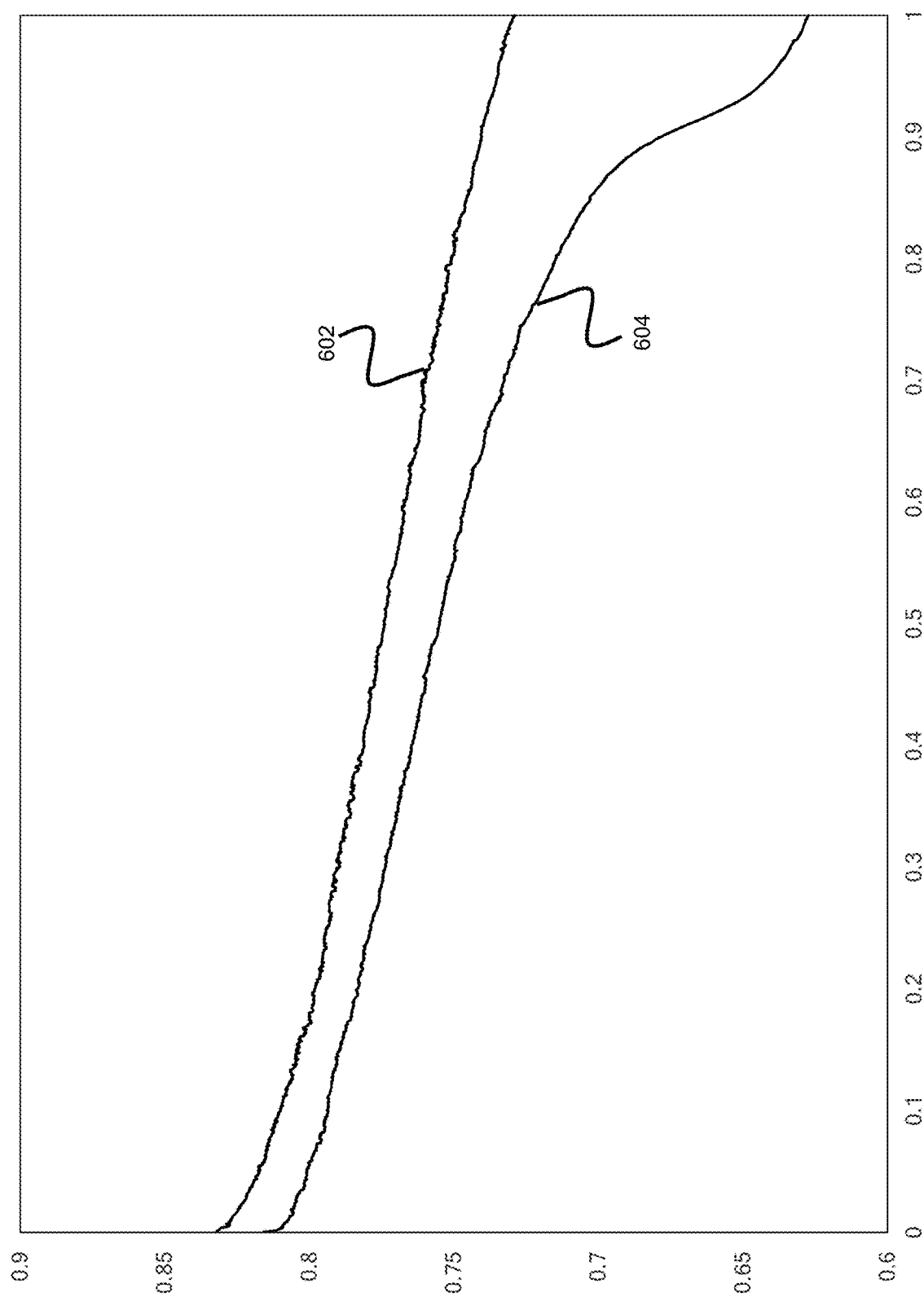
FIG. 6 is a graphical depiction of the discharge voltage vs time showing the effect of the application of the auxiliary circuit potential according to embodiments of the present disclosure.

FIG. 6 shows a boosted power circuit voltage (BPCV) 602 and a conventional power circuit voltage (CPCV) 604. The x-axis is given in units of hours and the y-axis is given in units of volts. At a discharge time of 1 hr, the boosted power circuit voltage 602 is increased by 16.2% relative to the conventional power circuit voltage 604.

Figure 7:
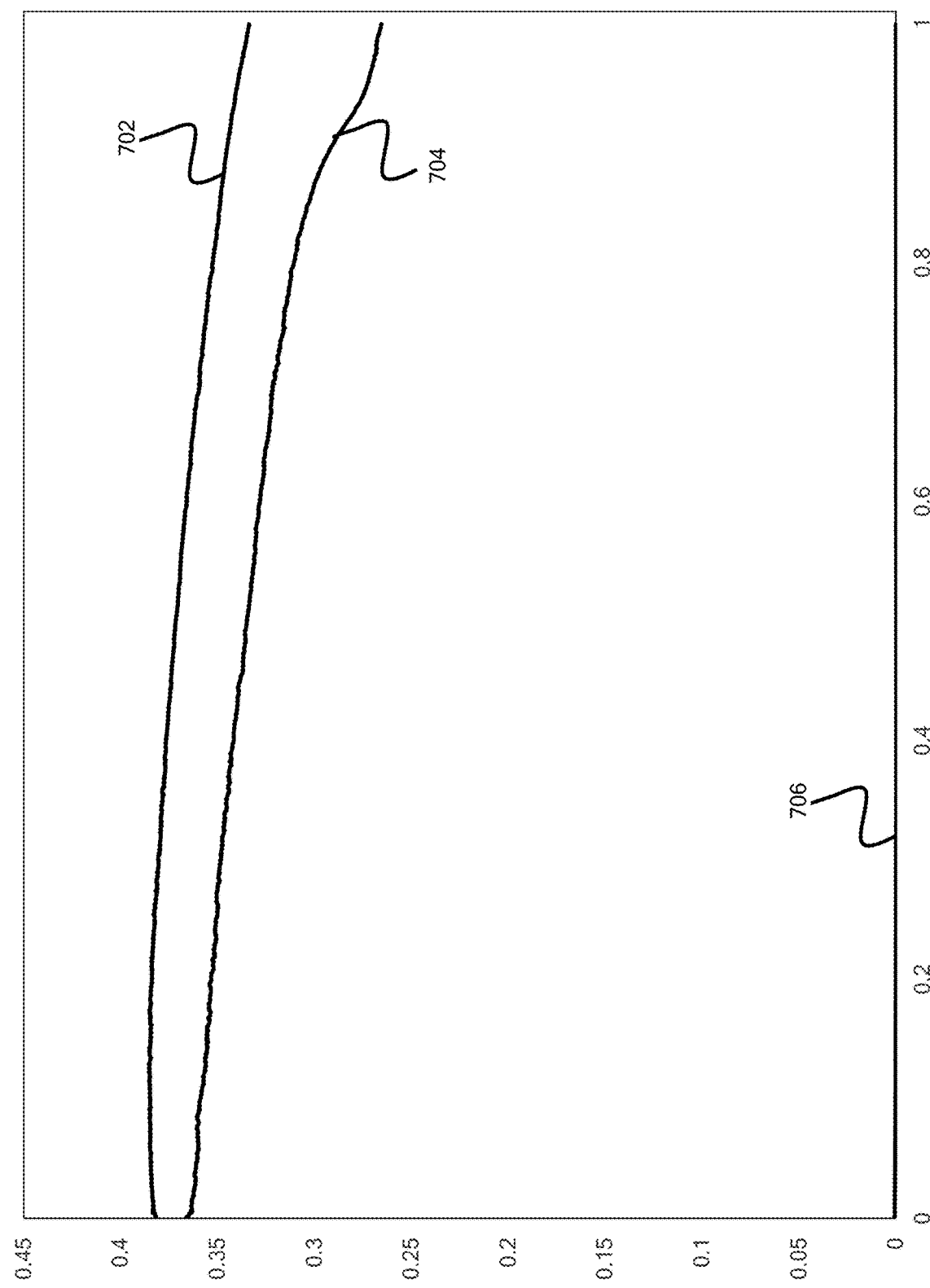
FIG. 7 is a graphical depiction of the discharge power vs time showing the effect of the application of the auxiliary circuit potential according to embodiments of the present disclosure.

FIG. 7 shows a boosted power circuit power (BPCP) 702, a conventional power circuit power (CPCP) 704, and an auxiliary circuit power (ACP) 706. The x-axis is given in units of hours and the y-axis is given in units of watts. At a discharge time of 1 hr, the BPCP 702 is increased by 25.8% relative to the CPCP 704. This is a BPCP-CPC:ACP ratio of 560:1.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A redox flow battery comprising:
   an ionically conductive separator comprising a working side and a counter side;
   a working side flowing electrolyte;
   a working electrode in ionic contact with the working side of the ionically conductive separator and the working side flowing electrolyte;
   a counter side flowing electrolyte;
   a counter electrode in ionic contact with the counter side of the ionically conductive separator and the counter side flowing electrolyte;
   an auxiliary electrode peripherally circumscribed by the working electrode in a common layer of the flow battery, wherein the auxiliary electrode is in ionic contact with the working electrode, the working side flowing electrolyte, and the working side of the ionically conductive separator;
   an electrically insulating peripheral gap separating the auxiliary electrode from the working electrode;
   a working electrode terminal conductively coupled to the working electrode;
   an auxiliary electrode terminal conductively coupled to the auxiliary electrode;
   a counter electrode terminal conductively coupled to the counter electrode; and an auxiliary power source electrically connected to the auxiliary electrode terminal and the counter electrode terminal, wherein the auxiliary power source is configured to
establish an auxiliary circuit voltage differential between the counter electrode terminal and the auxiliary electrode terminal,
control an auxiliary electrode voltage such that the auxiliary electrode voltage is within an electrochemical window of the working side flowing electrolyte, and
establish a voltage differential between the working electrode terminal and the auxiliary electrode terminal.

2. The redox flow battery of claim 1, wherein the working side flowing electrolyte comprises an aqueous acidic solution and the auxiliary electrode voltage is less than 1.23 Volts (V) vs a standard hydrogen electrode (SHE).

3. The redox flow battery of claim 1, wherein the auxiliary power source is configured such that a ratio of a boosted power circuit current minus a conventional power circuit current to auxiliary circuit current is greater than 1:1, when the auxiliary power source is activated.

4. The redox flow battery of claim 1, wherein the auxiliary power source is configured such that a ratio of a boosted power circuit current minus a conventional power circuit current to auxiliary circuit current is greater than 10:1, when the auxiliary power source is activated.

5. The redox flow battery of claim 1, wherein the auxiliary power source is configured such that a ratio of a boosted power circuit power minus a conventional power circuit power to auxiliary circuit power is greater than 1:1, when the auxiliary power source is activated.

6. The redox flow battery of claim 1, wherein the working electrode is substantially free of metallic electro-catalysts.

7. The redox flow battery of claim 1, wherein the ionically conductive separator, the working electrode, the counter electrode, and the auxiliary electrode comprise a substantially planar geometry.

8. The redox flow battery of claim 1, wherein the ionically conductive separator, the working electrode, the counter electrode, and the auxiliary electrode comprise a substantially cylindrical geometry.

9. The redox flow battery of claim 1, wherein the respective total surface areas of the working electrode and the auxiliary electrode define a working electrode to auxiliary electrode surface area ratio of at least 5:1.

10. The redox flow battery of claim 1, wherein the respective total surface areas of the working electrode and the auxiliary electrode define a working electrode to auxiliary electrode surface area ratio of between 5:1 and 100:1.

11. The redox flow battery of claim 1, wherein:
the working electrode defines a circular geometry comprising a working electrode inside diameter, a working electrode outside diameter, and a working electrode surface area defined between the working electrode inside diameter and the working electrode outside diameter;
the auxiliary electrode defines a circular geometry comprising an auxiliary electrode outside diameter circumscribing an auxiliary electrode surface area; and
the electrically insulating peripheral gap comprises an annular region between the working electrode inside diameter and the auxiliary electrode outside diameter.

12. The redox flow battery of claim 1 wherein
the electrically insulating peripheral gap has a thickness of between 5 mm and 0.001 mm, and
the electrically insulating peripheral gap comprises an electrically insulating material.

13. The redox flow battery of claim 1, wherein the working side flowing electrolyte comprises an aqueous acidic solution.

14. The redox flow battery of claim 1, wherein the working side flowing electrolyte has a conductivity of at least 0.045 Siemens per centimeter.

15. The redox flow battery of claim 1, wherein the working side flowing electrolyte comprises one or more of vanadium, iron, chromium, bromine, chlorine, sulfuric acid, hydrochloric acid, redox active organic chemicals, zinc, lithium, and aluminum.

16. The redox flow battery of claim 1, wherein the working side flowing electrolyte comprises vanadium chloride and hydrochloric acid.

17. The redox flow battery of claim 1, wherein the counter side flowing electrolyte comprises one or more of vanadium, iron, chromium, bromine, chlorine, sulfuric acid, hydrochloric acid, redox active organic chemicals, zinc, lithium, and aluminum.

18. The redox flow battery of claim 1, wherein the counter side flowing electrolyte comprises iron chloride and hydrochloric acid.

19. The redox flow battery of claim 1, wherein the redox flow battery is structurally configured such that the working side flowing electrolyte and the counter side flowing electrolyte are only in ionic communication through the ionically conductive separator.

* * * * *